United States Patent [19]
Misik

[11] Patent Number: 5,912,518
[45] Date of Patent: Jun. 15, 1999

[54] MOTOR COIL ASSEMBLY

[76] Inventor: Michael F. Misik, 5032 N. Denal St., Norridge, Ill. 60656

[21] Appl. No.: 08/955,758

[22] Filed: Oct. 22, 1997

[51] Int. Cl.$^6$ .................................................... H02K 11/00
[52] U.S. Cl. ............................ 310/71; 310/164; 310/191
[58] Field of Search ................................ 310/71, 164, 191

[56] References Cited

U.S. PATENT DOCUMENTS

| | | | |
|---|---|---|---|
| 4,873,464 | 10/1989 | Wang | 310/249 |
| 5,264,816 | 11/1993 | Degenhart et al. | 336/192 |

*Primary Examiner*—Nestor Ramirez
*Assistant Examiner*—Thanh Lam
*Attorney, Agent, or Firm*—Terrence Martin; Jules J. Morris; Sean D. Detweiler

[57] ABSTRACT

A synchronous motor stator coil assembly has a bobbin with a pair of annular spaced flanges, with one flange having an open receptacle shell formed integrally on the outer face and extending axially outwardly. The receptacle has an electrical terminal pin centrally located in a cylindrical surface in the receptacle. The pin has a projection extending through a slot in the bobbin flange. A coil of continuous electrical conductor is wound on the bobbin with one end of the coil conductor attached to the pin projection. An electrical wiper contact is disposed in a slot in the cylindrical wall in spaced parallel relationship to the central terminal pin. A projection on the wiper extends through a slot in the bobbin flange and is connected to the opposite end of the coil conductor. The central pin and wiper contact permit a widely used low voltage coaxial type harness connector to be plugged into the receptacle for supplying low voltage power to the motor. A cover with a cut-out is received over the coil assembly with the receptacle extending outwardly through the cut-out.

10 Claims, 4 Drawing Sheets

FIG. 6
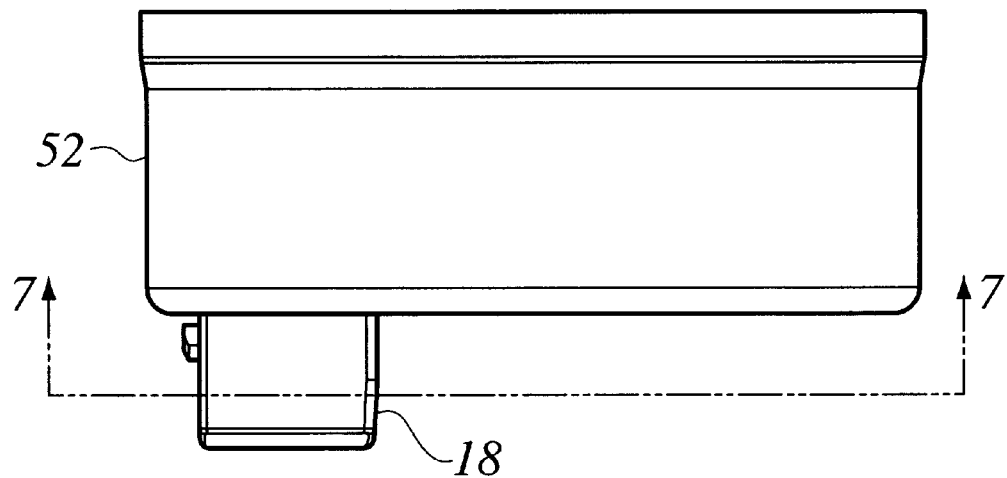
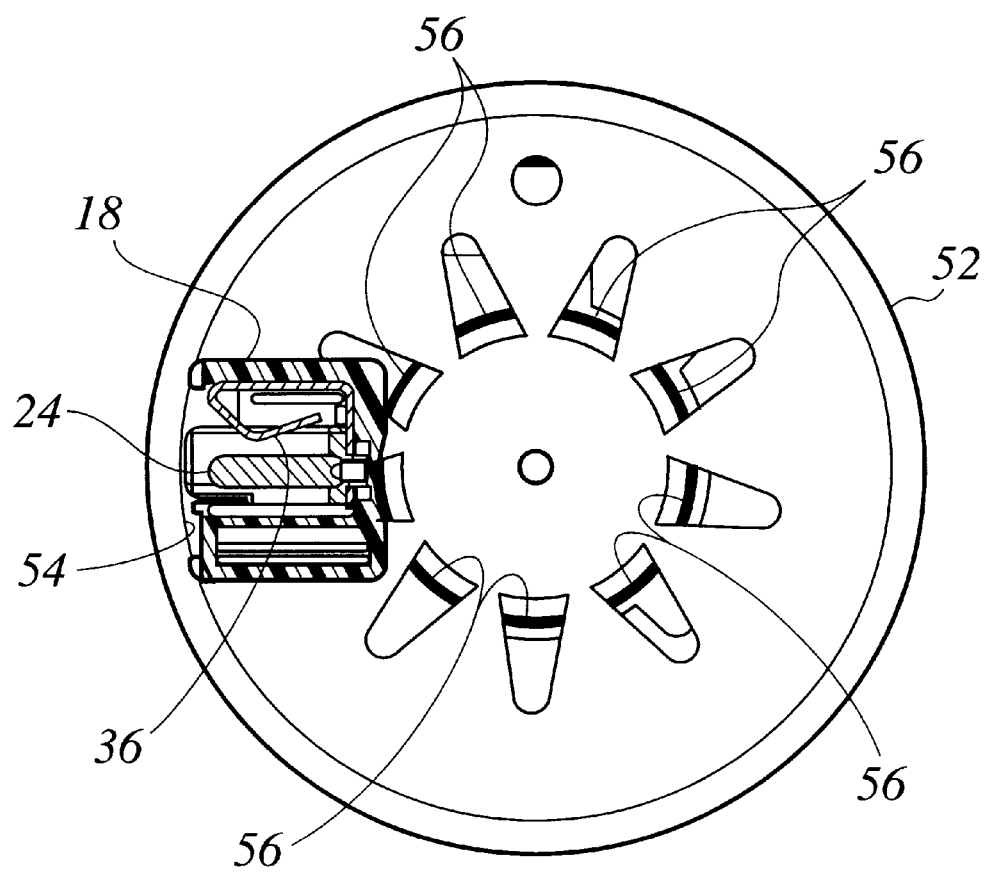
FIG. 7

MOTOR COIL ASSEMBLY

BACKGROUND OF THE INVENTION

The present invention relates to stator coil assemblies for low wattage motors and particularly to motors employed for timing devices as, for example, electrical programmer timers. Typically motors employed for this type of service application are synchronous motors employing a permanently magnetized rotor and a single continuously wound stator coil disposed annularly about the rotor.

Typically, low wattage synchronous timing motors are designed to operate at line voltage for example 120 volts RMS AC encountered in residential power service. Thus, programmer timers and other devices employing such small synchronous timing motors are intended to be connected to the power inlet of the programmer timer or device to be controlled with the timing motor. Typical of such applications are programmer timers for household appliances such as washing machines, dishwashers, clothes dryers; and, clocks employed on cooking appliances for controlling the duty cycle of the heating elements in the cooking appliance.

Typically, synchronous timing motors for these residential applications are wired into the appliance wiring harness concealed behind a control panel or cover and a service cord or power connection cable is provided for plugging into the residential power receptacle. Electromechanical programmer timers for such residential appliances have found widespread use because of their reliability, robustness and low manufacturing cost. Recently, it has been desired to interrupt the power to the timing motor for adding additional control features to the appliance yet retain the economical electromechanical programmer timer, thus, it has been required to provide a switching mechanism capable of handling the household power line voltage.

Recently it has become desired to provide electronic microprocessor based controls for certain appliances employing electromechanical programmer timers where household power line voltage is not practical and where a low voltage supply must be employed for safety considerations. Such a situation arises where it is desired to provide programmer timer control of a hot water heater where there is an increased hazard of electrical shock. It has thus been desired to use an existing electromechanical programmer timer for low voltage operation without redesign and the attendant increase in manufacturing costs associated with any such redesign, including retooling costs. Where it has been desired to utilize electronic control for low voltage applications, it has been desired to find a cost effective way to provide interconnection between an electronic circuit board having a microprocessor and an existing synchronous timing motor used in an electromechanical programmer timer.

BRIEF SUMMARY OF THE INVENTION

It is an object of the present invention to provide a low cost construction for a motor stator coil assembly, particularly for a synchronous motor, where the coil assembly is adapted for connection to a low voltage power source employing a commonly utilized coaxial type low voltage wiring harness connector.

It is a further object of the present invention to provide a low cost way of constructing a synchronous timing motor coil assembly from an existing motor construction, with a minimum of rework, which is adapted for ready connection to a coaxial type low voltage harness connector.

The present invention provides a stator coil assembly, typical of a synchronous motor, having a bobbin having an annular stator coil wound thereon between spaced flanges, with a receptacle shell formed preferably integrally on one of the flanges. An electrical terminal pin is received in the receptacle shell with a portion thereof extending through the flange and connected to one end of the wound coil conductor. A second resilient wiper connector is disposed in spaced relationship to the pin and also has a portion in the form of a tab or lug extending through the bobbin flange for connection to the opposite end of the wound coil conductor. The arrangement of the pin and wiper contact is such that a conventional coaxial low voltage wire harness connector having a central bore can be pushed onto the pin with the wiper making contact with the cylindrical coaxial surface of the harness connector. The receptacle shell is received through a cutout formed in a cover which typically has an end of a rotor shaft journalled therein.

The present invention thus permits an existing mass produced synchronous timing motor to be modified to add a receptacle shell to one flange thereof and a cutout formed in the motor cover as minimal modifications to an existing design which adapt the motor for connection to a low voltage coaxial harness connector for applications where live voltage would pose a safety hazard.

BRIEF DESCRIPTION OF THE DRAWINGS

FIG. 6 is a rear elevation view of the coil assembly of FIG. 3; and,

FIG. 7 is a section view taken along section indicating lines 7—7 of FIG. 6.

DETAILED DESCRIPTION OF THE INVENTION

Figure 1:
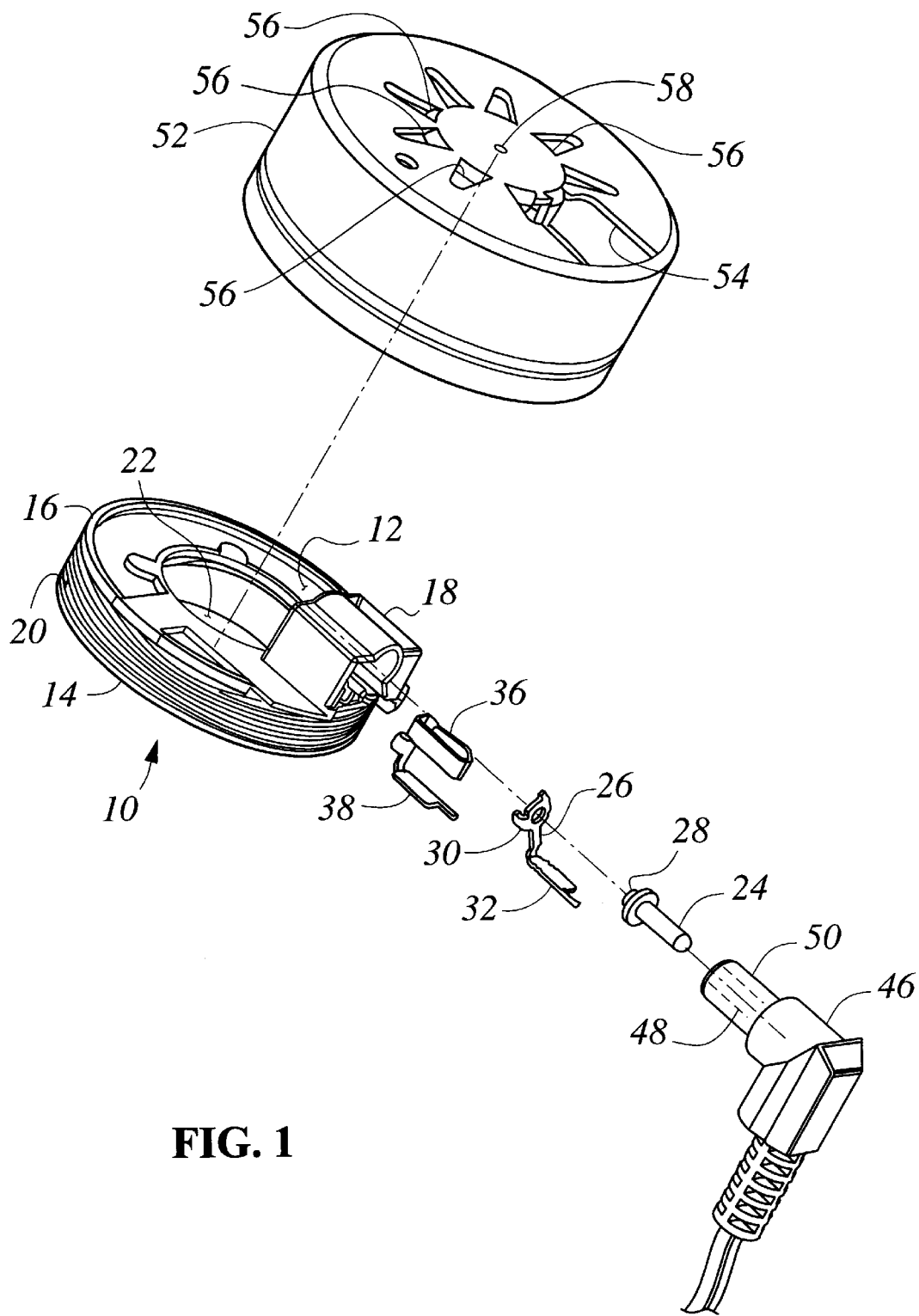
FIG. 1 is an exploded view of the motor coil assembly of the present invention including a cover.
Figure 2:
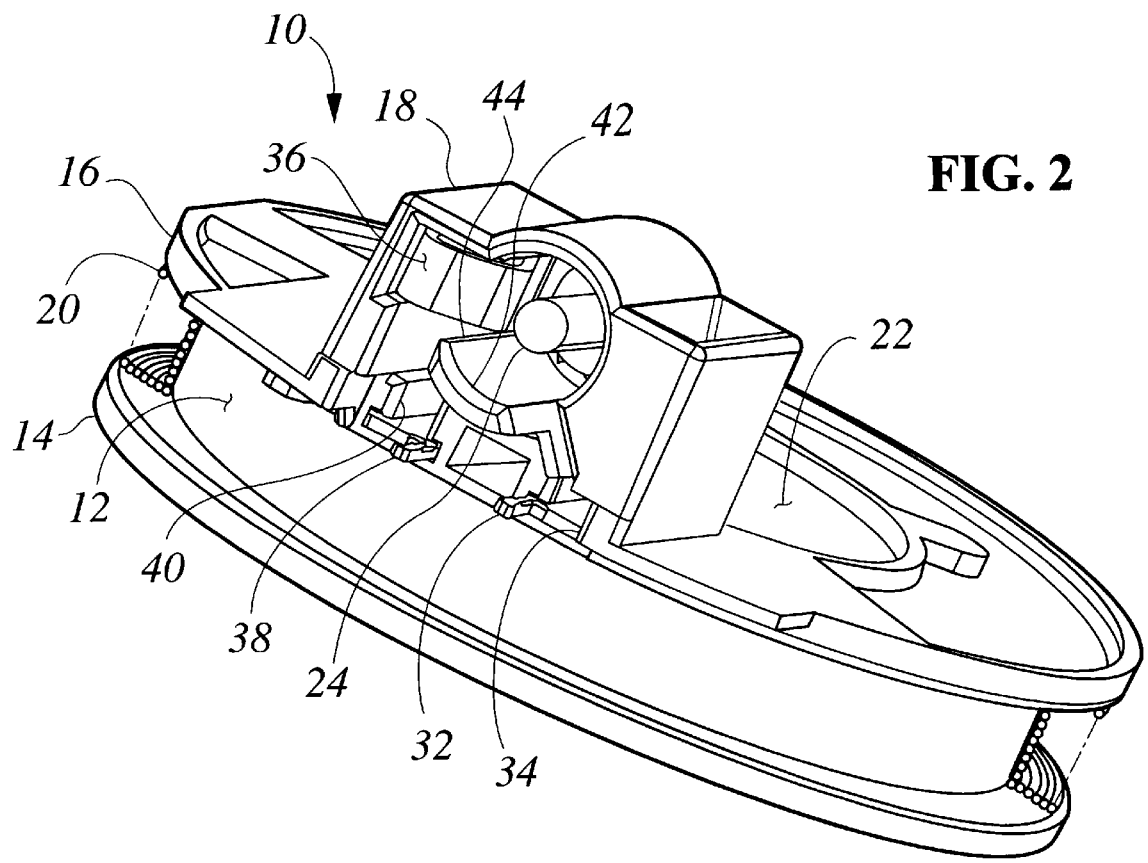
FIG. 2 is a perspective view of the bobbin and coil assembly of FIG. 1 showing the open end of the receptacle shell.
Figure 5:
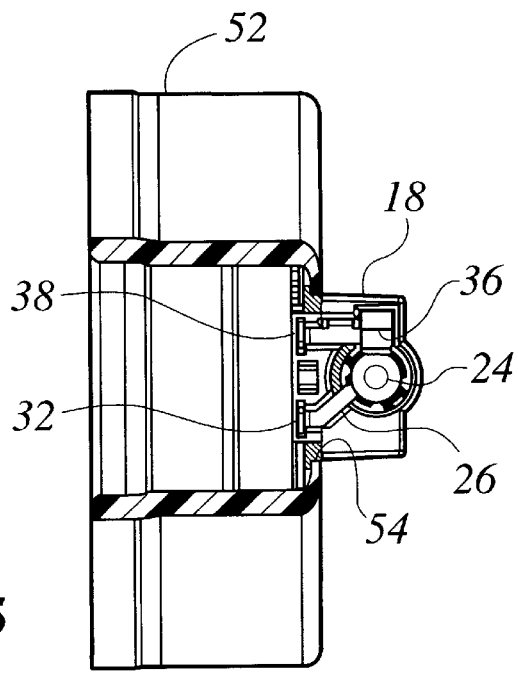
FIG. 5 is a section view taken along section indicating lines 5—5 of FIG. 3.
Figure 3:
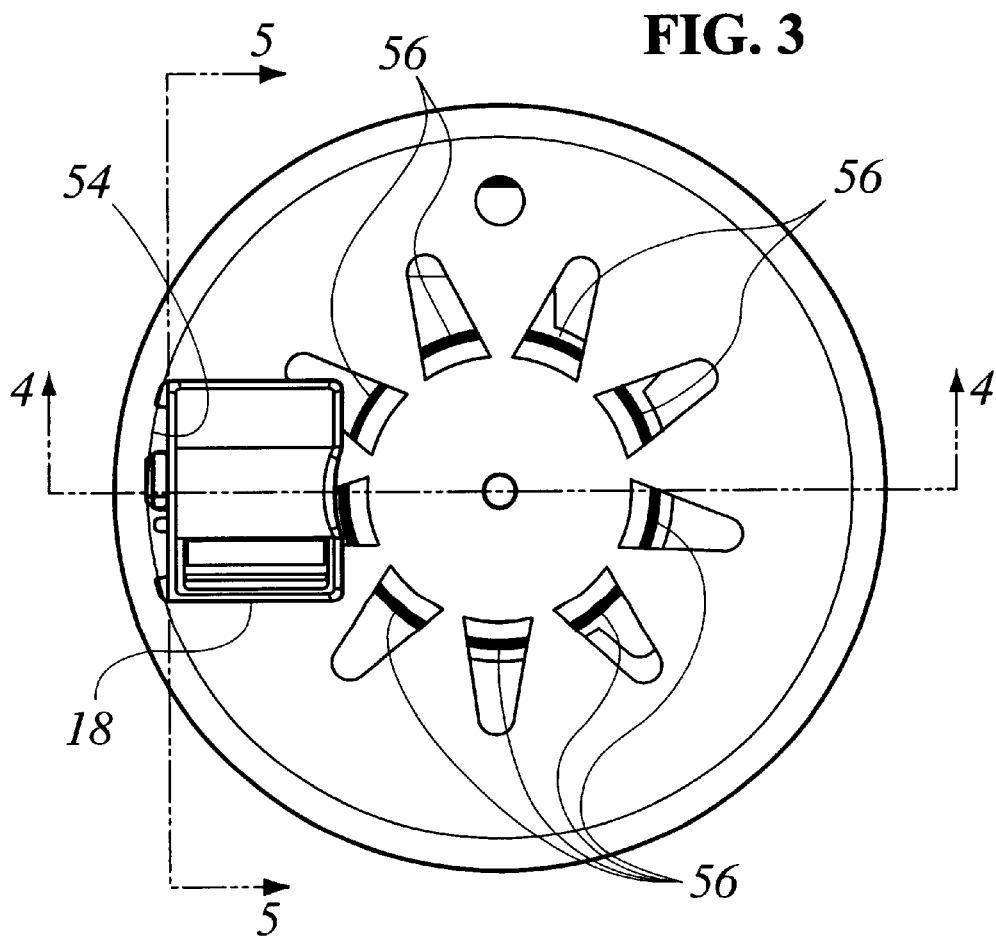
FIG. 3 is a top view of the coil assembly of FIG. 2.
Figure 4:
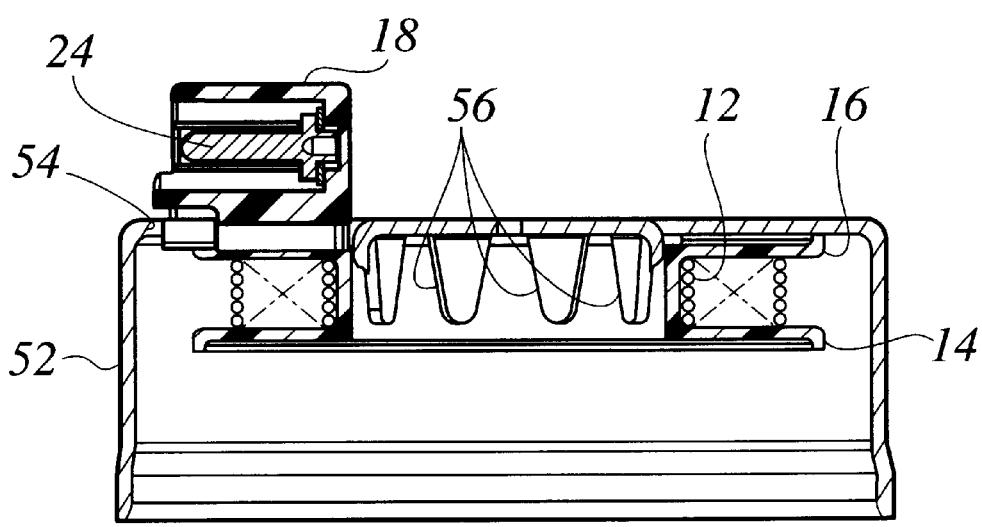
FIG. 4 is a section view taken along section indicating lines 4—4 of FIG. 3.

Referring to FIGS. 1 and 2, the coil assembly is indicated generally at 10 and includes a bobbin 12 having first and second annular flanges 14, 16 disposed in axially spaced arrangement. Flange 16 illustrated as the upper flange in FIG. 1 has formed, preferably integrally, as one piece therewith an open receptacle shell 18 which extends axially from the face of the flange 16.

A coil 20 of suitable continuous conductor such as magnet wire is wound on bobbin 12 in a manner well known in the art. It will be understood that the open central region 22 of the bobbin 12 is adapted to have received therethrough a magnetized rotor (not shown) in a manner well known in the synchronous motor art.

Referring to FIGS. 1 through 7, a generally central electrical terminal pin or post 24 is attached to a terminal lug 26 preferably by inserting pilot portion 28 of the pin 24 into an aperture 30 formed in the lug 26 and riveting the pilot portion 28 thereover to attach the lug 26 to pin 24. A projection portion 32 of the lug 26 thus extends away from the pin 24; and, projection 32 is received through a cut-out or slot 34 (see FIG. 2) formed in flange 16 and extends from the surface of bobbin 12 and is connected to one end of the conductor of coil 20, preferably by wrapping and/or soldering A second electrical terminal in the form of a wiper 36 is preferably formed by bending a flat metal strip of conductive material back upon itself to form a resilient generally U-shaped wiper terminal. Wiper terminal 36 has formed preferably integrally therewith as one piece a projection or lug 38 extending therefrom in spaced relationship. Wiper terminal 36 is received in the receptacle shell 18 with its projection 38 extending in a slot 40 provided in the flange 16. It will be understood that terminal projection 38 is connected, as for example by wrapping and/or soldering to the end of the coil 20 opposite the end connected to terminal projection 32.

The pin 24 is preferably centrally located in receptacle shell guide surface 42 which has a generally circular cylindrical configuration; and, wiper 36 is disposed in generally spaced parallel arrangement with pin 24 and is disposed in a slot 44 formed in the wall of surface 42 as shown in FIG. 2.

Referring to FIG. 1, a typical coaxial low voltage wiring harness connector is shown at 46 and has a bore 48 formed therein which is adapted to be pushed over pin 24 for connection therewith. Connector 46 has a cylindrical outer conductive surface 50 which makes wiping contact with wiper 36 for coaxial electrical connection with pin 24 and wiper 36. The arrangement of the connector pin 24 in wiper contact 36 thus permits plug in or push in connection of a low voltage wiring harness, typical of the type provided on a low voltage battery charger or transformer power supply. The coaxial connector may thus be of the type found in widespread usage and may be readily plugged into the motor without requiring any additional components or manual operations for connection.

Referring to FIGS. 1, and 3 through 7, a typical synchronous motor casing or cover 52 is shown as having a cutout 54 formed therein through which the receptacle shell 18 extends outwardly when the cover is assembled over the coil assembly 10. As is known in the art, salient poles for the motor are formed as tabs or lugs 56 stamped in the upper surface of the cover; and, an aperture 58 is formed centrally in the cover and which is adapted for journalling an unshown rotor shaft.

The present invention thus provides for direct plug-in connection to a low voltage power supply of the synchronous motor coil assembly and provides for such connection with minimum modifications to an existing residential power line voltage motor design so as to provide for many common components of the motor and yet provide low voltage operation of the motor with a minimum of rework and cost penalty.

Although the invention has hereinabove been described with respect to the illustrated embodiments, it will be understood that the invention is capable of modification and variation and is limited only by the following claims.

I claim:

1. A coil assembly for a synchronous motor operating at relatively low voltage and low wattage, comprising:
   (a) a bobbin having a pair of spaced flanges with a stator coil thereon;
   (b) an open receptacle shell formed integrally as one piece with one of said pair of spaced flanges;
   (c) an electrical terminal including a pin received generally centrally in said open receptacle shell and including an associated tab extending through said flange and connected to one end of said coil; and
   (d) an electrical wiper terminal received in said open receptacle shell, said wiper terminal being in a spaced and generally parallel relationship to said pin with at least a portion of said wiper terminal extending through said first flange and connected to an opposite end of said coil, wherein said wiper terminal comprises a resilient wiper, and said terminals are adapted for the connection of a push-in connector harness of the co-axial type provided on a low voltage power supply.

2. The assembly defined in claim 1, wherein said receptacle shell extends radially outwardly of said flange.

3. The assembly defined in claim 1, wherein said pair of spaced flanges has a circular cross-section.

4. The assembly defined in claim 1, wherein said wiper terminal is comprised of relatively thin material so as to allow the material to be folded to form said wiper.

5. The assembly defined in claim 1, wherein said wiper terminal is formed of one piece construction.

6. The assembly defined in claim 1, wherein said terminal pin and said tabs are formed of separate pieces interconnected.

7. A method of making a stator coil assembly for a motor operated at relatively low voltage and wattage, comprising:
   (a) forming a bobbin having a pair of spaced annular flanges and forming integrally with one of said flanges an open receptacle shell extending therefrom;
   (b) disposing a coil on said bobbin; and
   (c) disposing a pin centrally in said shell opening and connecting said pin through said one flange to one end of said coil.

8. The method defined in claim 7, wherein said step of disposing a coil includes winding a coil from a continuous length of conductor.

9. The method defined in claim 7, further comprising disposing a cover over said coil and bobbin and extending said receptacle shell through a cut-out in said cover.

10. The assembly defined in claim 1, wherein said electrical terminal in combination with said wiper terminal and said pin are shaped to receive a coaxial low voltage wiring harness connector.

* * * * *